US012715331B2

(12) United States Patent
Ishida et al.

(10) Patent No.: US 12,715,331 B2
(45) Date of Patent: Aug. 25, 2026

(54) CHARGE/DISCHARGE SYSTEM AND MOVING BODY

(71) Applicant: KABUSHIKI KAISHA TOSHIBA, Tokyo (JP)

(72) Inventors: Masaaki Ishida, Kawasaki Kanagawa (JP); Tetsu Shijo, Tokyo (JP); Kenichirou Ogawa, Kawasaki Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 786 days.

(21) Appl. No.: 18/180,580

(22) Filed: Mar. 8, 2023

(65) Prior Publication Data

US 2024/0092213 A1 Mar. 21, 2024

(30) Foreign Application Priority Data

Sep. 15, 2022 (JP) ................................ 2022-147205

(51) Int. Cl.
*H02J 7/00* (2026.01)
*B60L 53/64* (2019.01)
*G06Q 50/06* (2012.01)
*H02J 7/90* (2026.01)

(52) U.S. Cl.
CPC .............. *B60L 53/64* (2019.02); *G06Q 50/06* (2013.01); *H02J 7/971* (2026.01)

(58) Field of Classification Search
CPC ..... B60L 53/64; G06Q 50/06; H02J 7/007188
USPC ................................................. 320/127, 137
See application file for complete search history.

(56) References Cited

U.S. PATENT DOCUMENTS

2011/0000726 A1 1/2011 Tanaka
2012/0249068 A1 10/2012 Ishida
2014/0136448 A1 5/2014 Takayama et al.
2017/0355277 A1* 12/2017 Zhou ..................... G06Q 40/12
(Continued)

FOREIGN PATENT DOCUMENTS

JP 2001306839 A 11/2001
JP 2010145309 A 7/2010
(Continued)

OTHER PUBLICATIONS

Dittmeyer, et al., "Crowd oil not crude oil", Nature Communications (vol. 10, No. 1), 2019, p. 1818 (8 pages), DOI: 10.1038/s41467-019-09685-x, https://www.nature.com/articles/s41467-019-09685-x.

(Continued)

*Primary Examiner* — Zixuan Zhou
(74) *Attorney, Agent, or Firm* — Holtz, Holtz & Volek PC

(57) ABSTRACT

According to one embodiment, a charge/discharge system includes a storage battery and a control device. The storage battery is configured to absorb CO2 during charging and release CO2 during discharging. The control device is configured to control a charge/discharge operation of the storage battery. The control device is configured to calculate a power trading price. The control device is configured to calculate a power trading price. The control device is configured to control the charge/discharge operation of the storage battery to perform charging and discharging when the power trading price during charging is lower than the power trading price during discharging.

12 Claims, 13 Drawing Sheets

(56) References Cited

U.S. PATENT DOCUMENTS

| | | | | |
|---|---|---|---|---|
| 2021/0066706 | A1 * | 3/2021 | Belcher | H01M 4/463 |
| 2022/0097552 | A1 | 3/2022 | Dow | |
| 2023/0074012 | A1 | 3/2023 | Ishida | |
| 2023/0222588 | A1 * | 7/2023 | Kittaka | G06Q 30/0206<br>705/37 |

FOREIGN PATENT DOCUMENTS

| | | | |
|---|---|---|---|
| JP | 2010149586 | A | 7/2010 |
| JP | 2010163028 | A | 7/2010 |
| JP | 2016071843 | A | 5/2016 |
| JP | 2020038770 | A | 3/2020 |
| JP | 2022017970 | A | 1/2022 |
| JP | 2023039690 | A | 3/2023 |
| WO | 2011077780 | A1 | 6/2011 |
| WO | 2013094146 | A1 | 6/2013 |

OTHER PUBLICATIONS

Shimizu Corporation, "CO2 Removal Air Conditioning System", 2020, 5 pages, https://www.challenge-zero.jp/jp/casestudy/78.

Voskian, et al., "Faradaic electro-swing reactive adsorption for CO2 capture", Energy & Environmental Science (vol. 12, No. 12), 2019, pp. 3530-3547, DOI: 10.1039/C9EE02412C, http://dx.doi.org/10.1039/C9EE02412C.

Japanese Decision to Grant a Patent (and an English language translation thereof) dated Jun. 17, 2025, issued in counterpart Japanese Application No. 2022-147205.

* cited by examiner

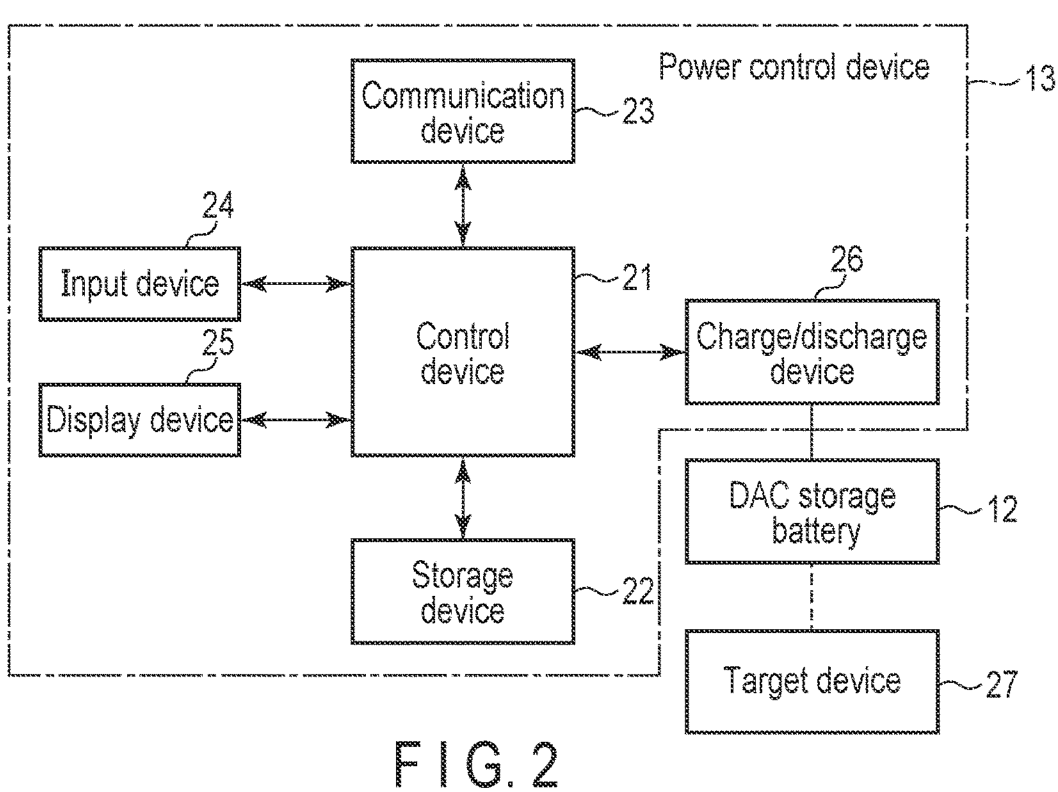
F I G. 2
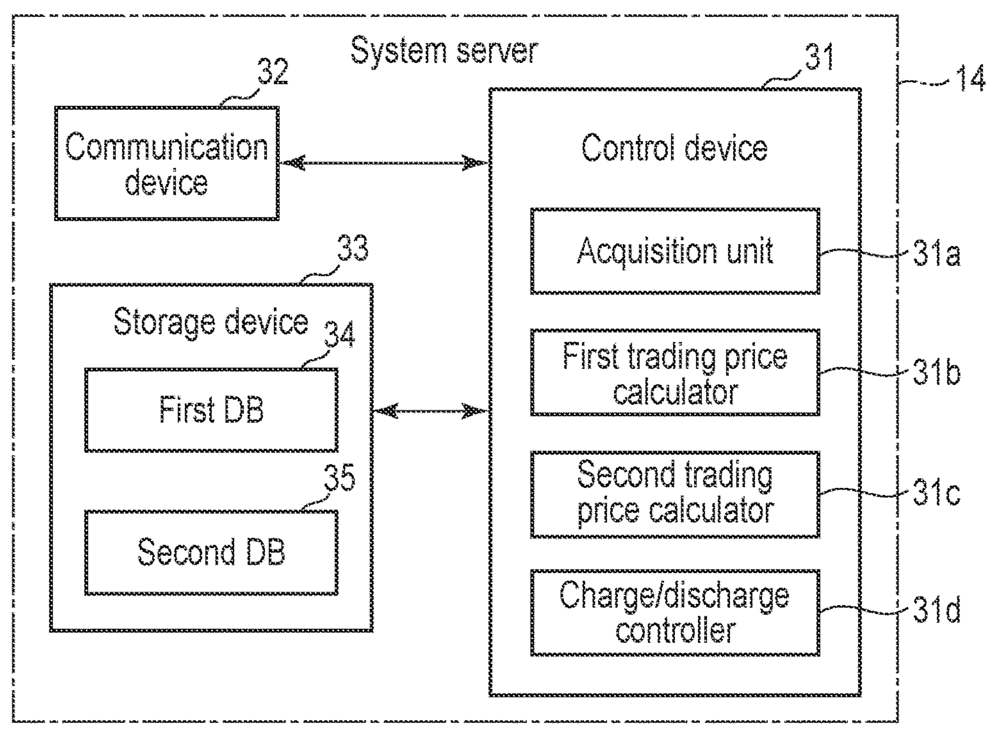
F I G. 3

34 First database

| User ID | Power purchase price setting value | Power selling price setting value |
|---|---|---|
| 001 | UB1=XX yen<br>UB2=XX yen | US1=XX yen<br>US2=XX yen |
| 002 | UB1=XX yen<br>UB2=XX yen | US1=XX yen<br>US2=XX yen |
| ⋮ | ⋮ | ⋮ |

35 Second database
| Price update date and time | Power purchase price | Emissions trading price (sale price) | Power selling price | Emissions trading price (purchase price) |
|---|---|---|---|---|
| XX year XX month XX day XX:XX:XX | BP=XX yen | ED1=XX yen | SP=XX yen | ED2=XX yen |
| XX year XX month XX day XX:XX:XX | BP=XX yen | ED1=XX yen | SP=XX yen | ED2=XX yen |
F I G. 5
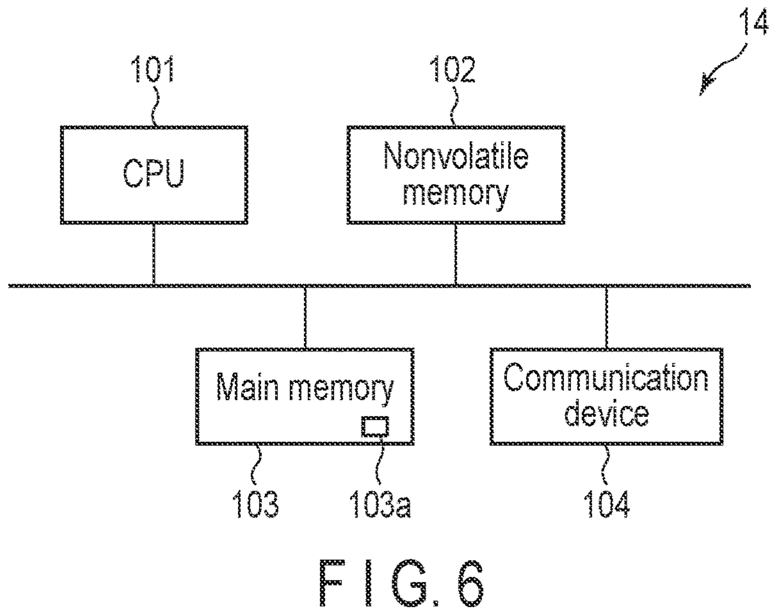
F I G. 6

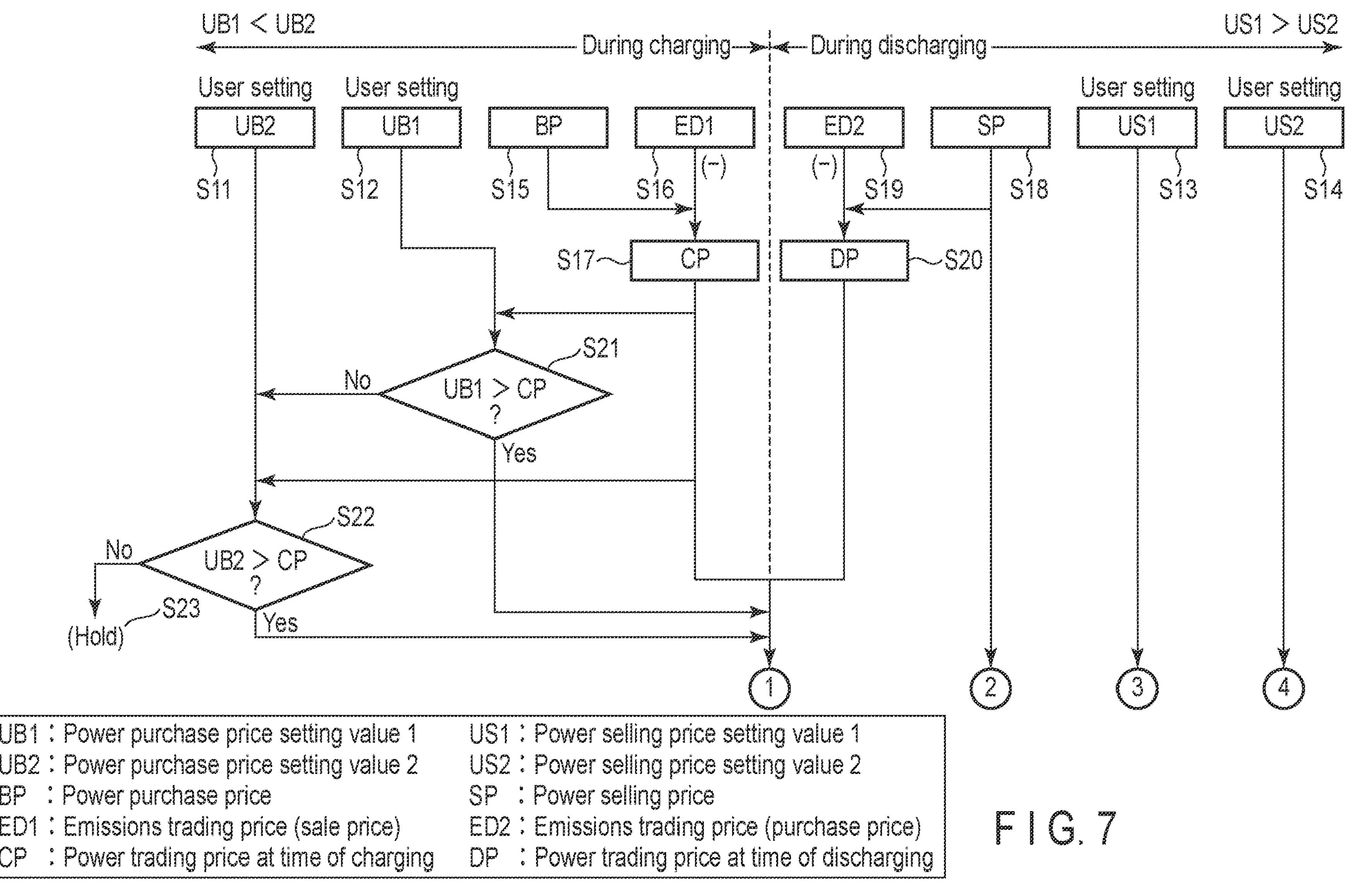
F I G. 7

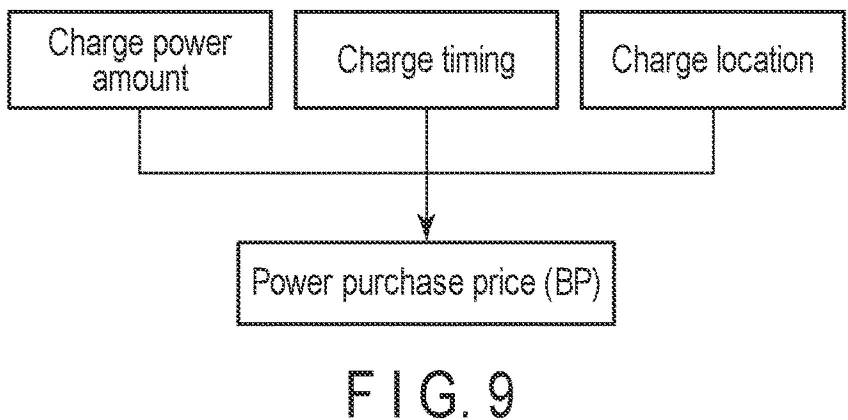
F I G. 9
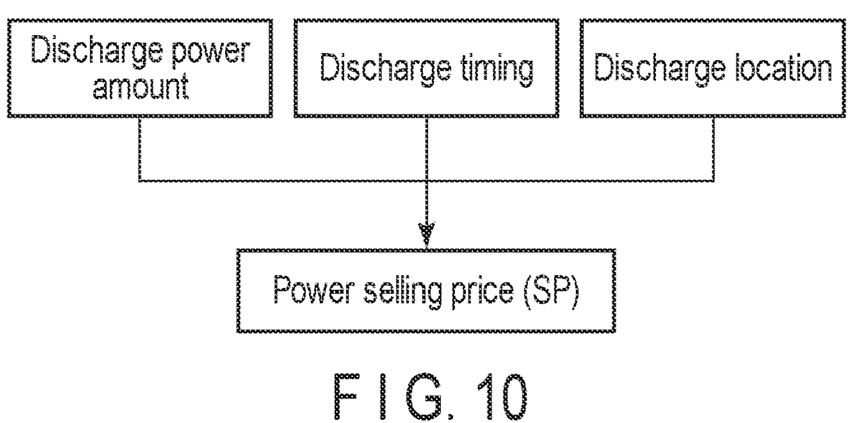
F I G. 10
14
System server
44
Charge station
41
DAC storage battery
42
Power control device
43
F I G. 11

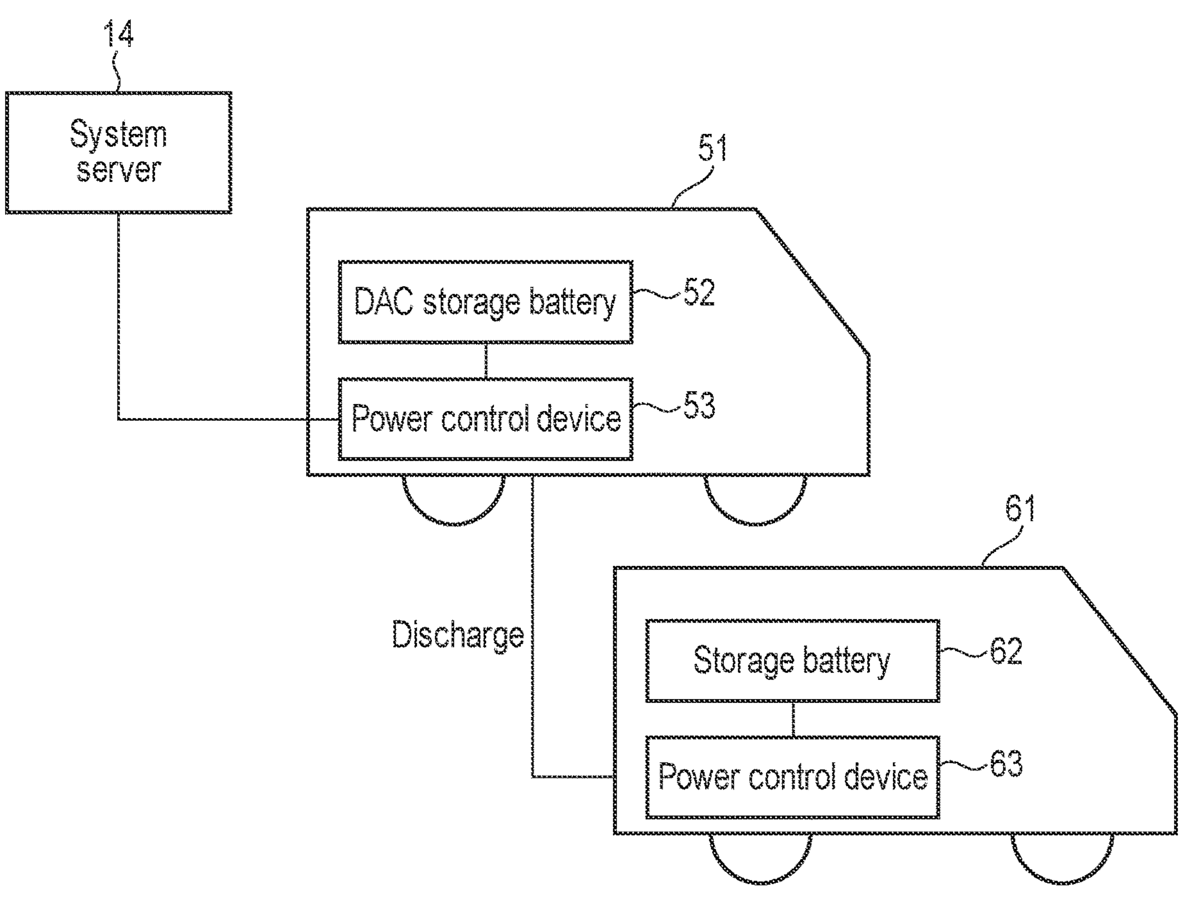
F I G. 12
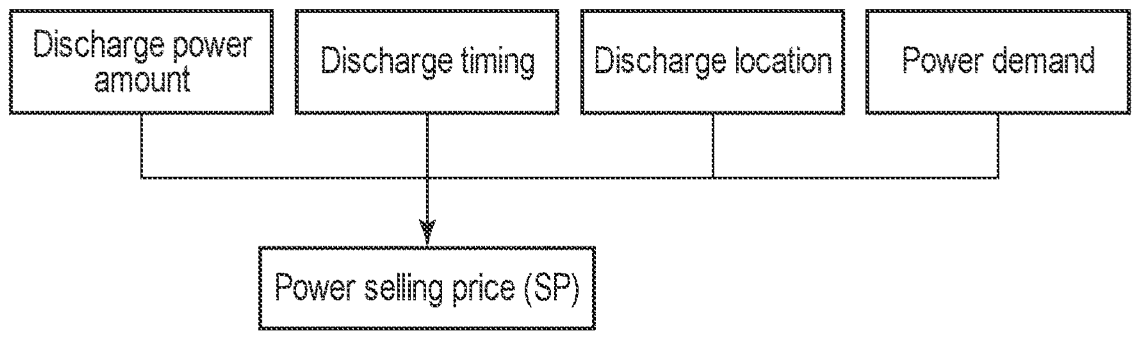
F I G. 13

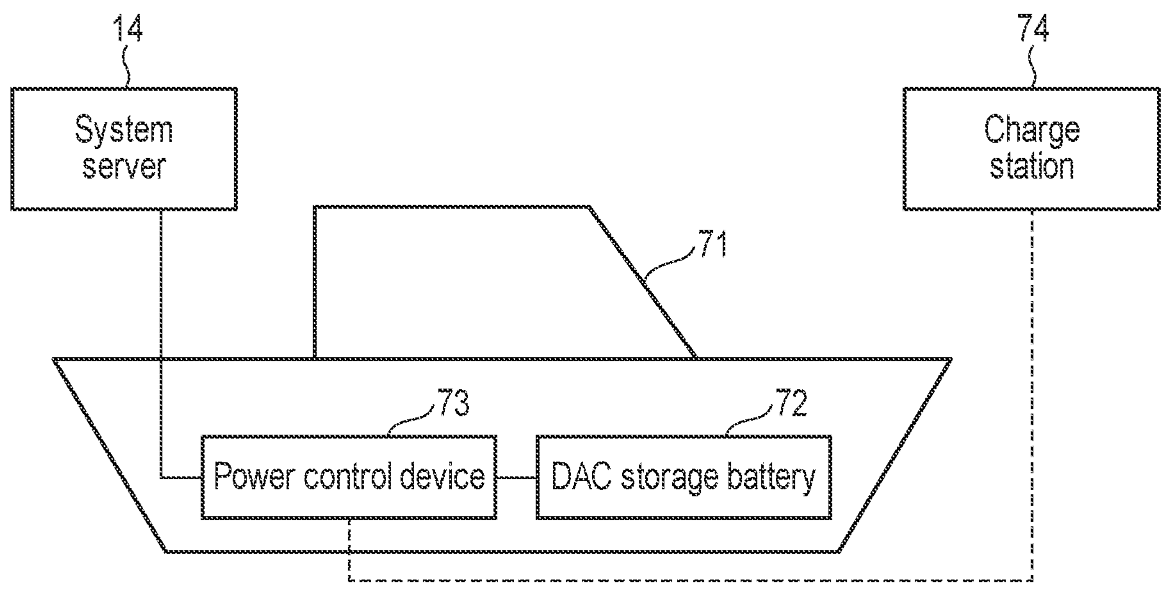
F I G. 14
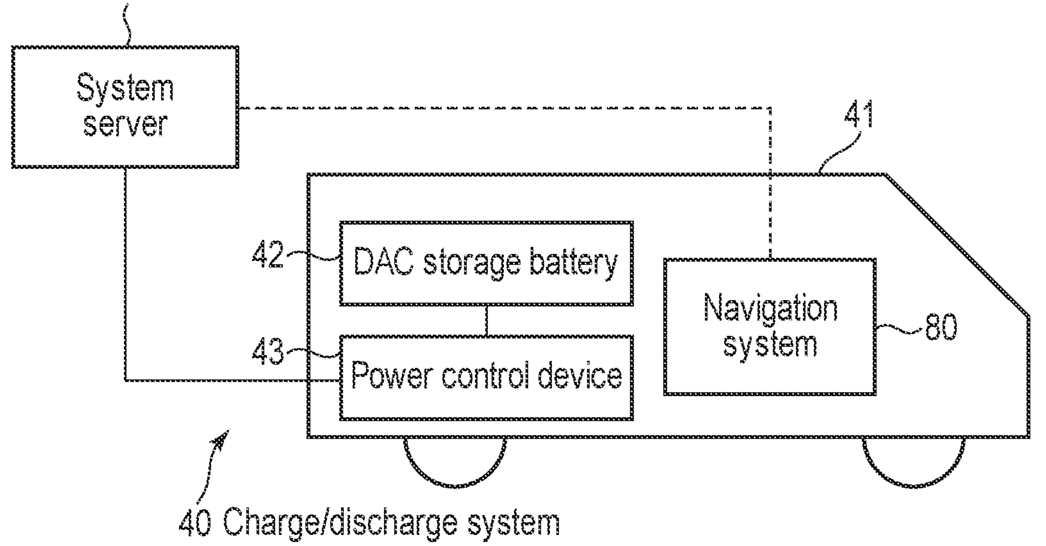
F I G. 15

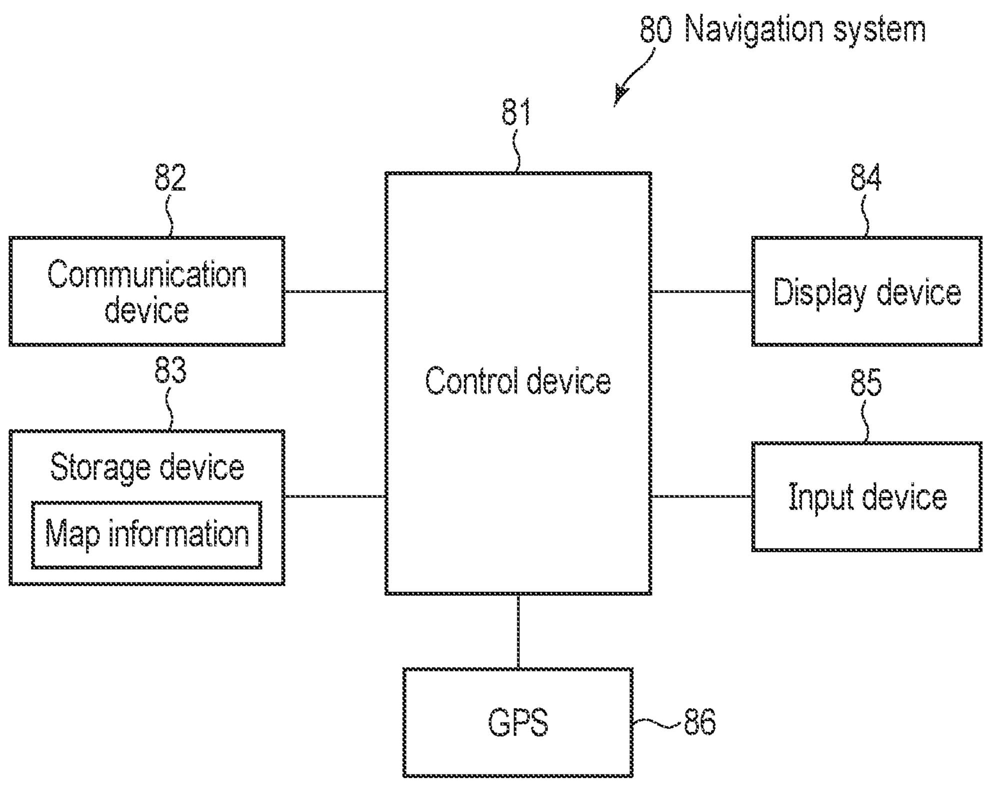
F I G. 16

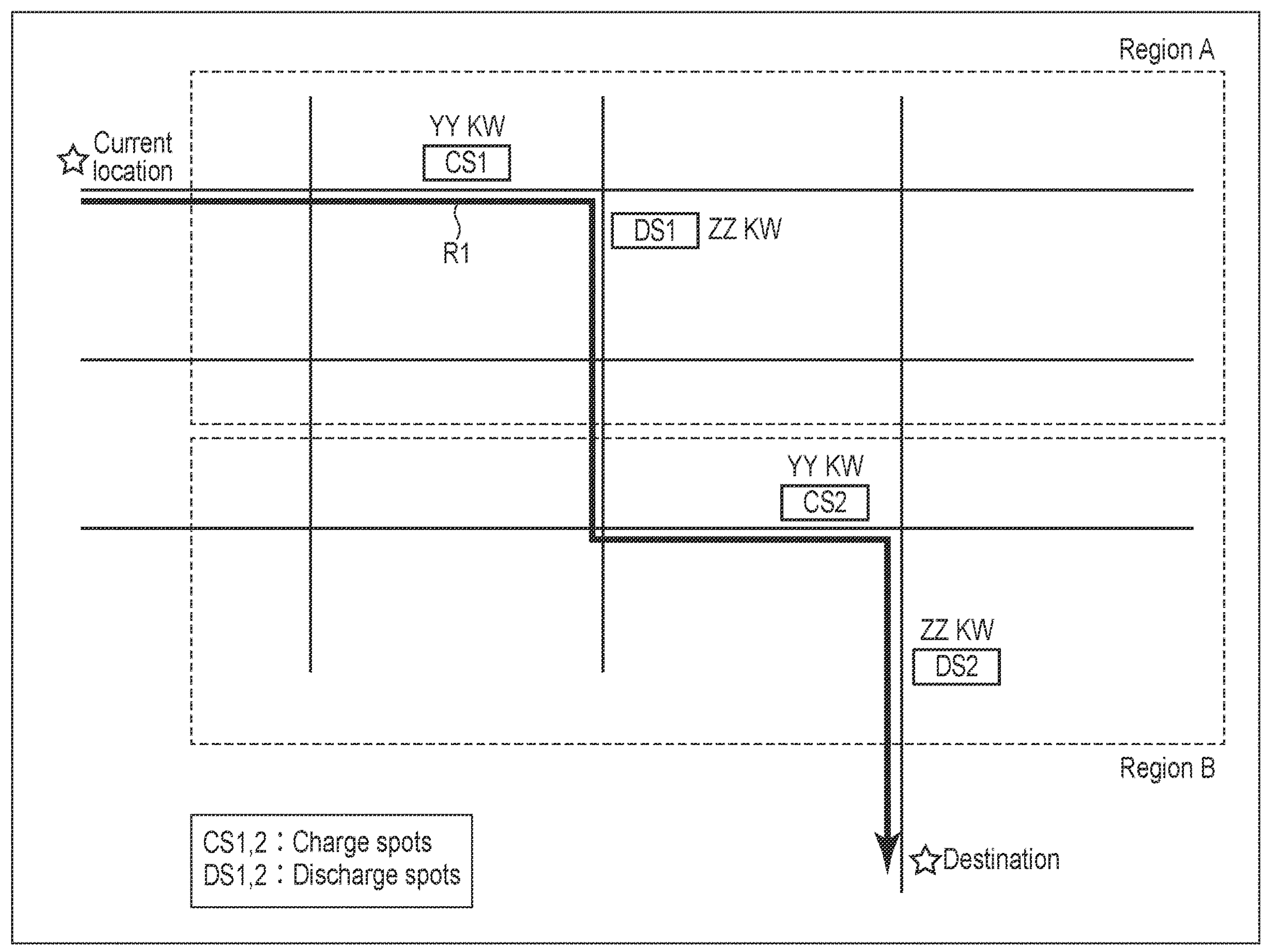
F I G. 17

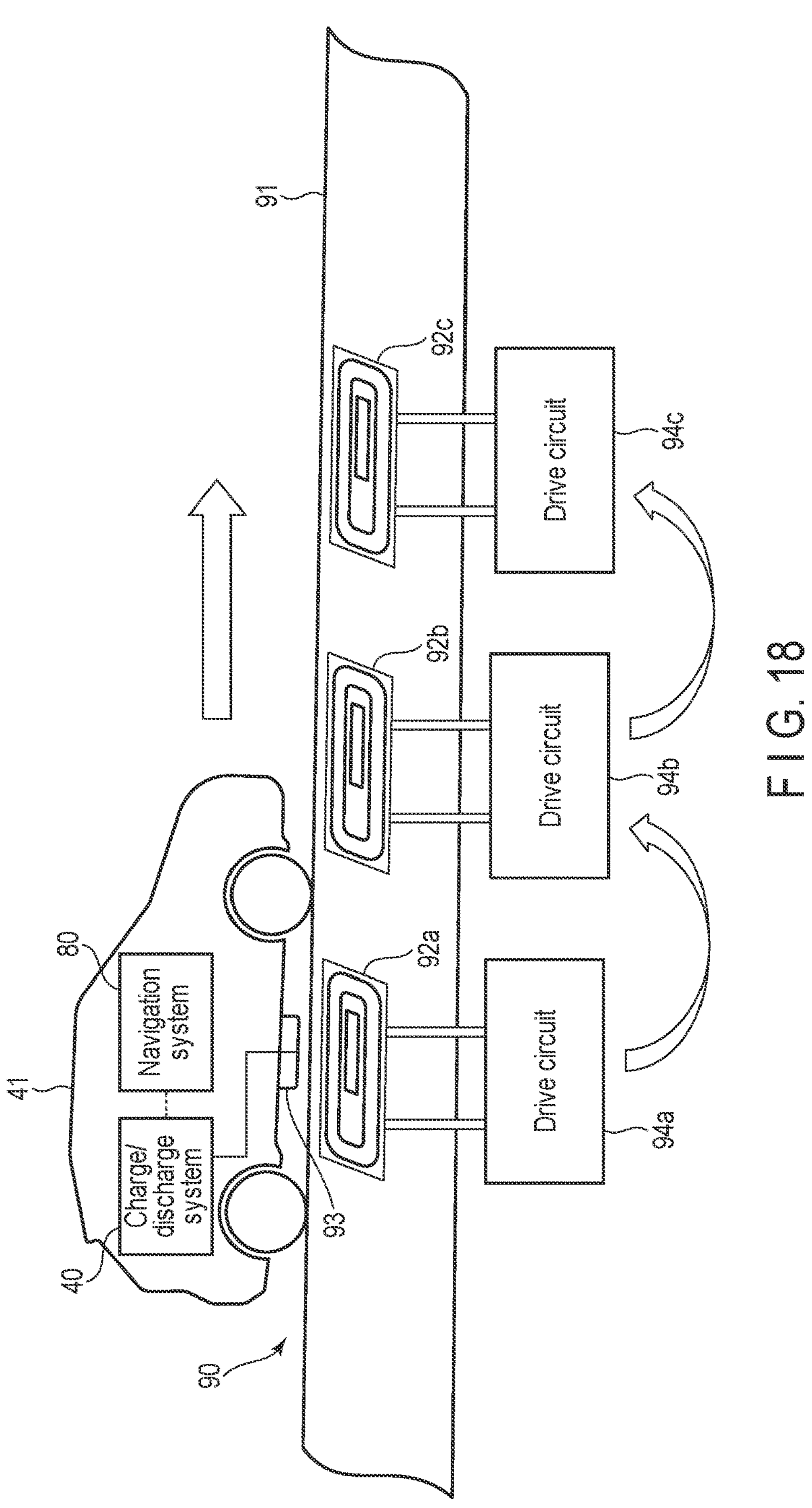
F I G. 18

CHARGE/DISCHARGE SYSTEM AND MOVING BODY

CROSS-REFERENCE TO RELATED APPLICATIONS

This application is based upon and claims the benefit of priority from Japanese Patent Application No. 2022-147205, filed Sep. 15, 2022, the entire contents of which are incorporated herein by reference.

FIELD

Embodiments described herein relate generally to a charge/discharge system and a moving body.

BACKGROUND

As measures for reducing carbon dioxide (CO2) emissions, fuel consumption improvement, utilization of fuels with low CO2 emissions (biofuels), electrification, improvement of operation methods, change to transportation means with low CO2 emissions per transportation amount (modal shift), and the like, as well as utilization of an economic method have been carried out. The economic method is a measure for encouraging CO2 emission reduction by adding a price to CO2 and imposing an economic burden according to the emission amount, and the collective term thereof is carbon pricing. As a main measure of the carbon pricing, there are a "carbon tax" that imposes a tax according to the amount of CO2 emissions, and an "emissions trading system" that trades the excess or deficiency of CO2 emissions between countries or between companies.

With the background described above, in recent years, for example, a storage battery having CO2 absorption characteristics at the time of charging has been developed for a storage battery mounted on an electric vehicle, a stationary storage battery for a house, or the like, and a mechanism for allowing a user who possesses such an environmentally friendly storage battery to obtain a profit is required.

BRIEF DESCRIPTION OF THE DRAWINGS

FIG. 2 is a block diagram illustrating a configuration of a power control device used in the charge/discharge system.

FIG. 3 is a block diagram illustrating a configuration of a system server used in the charge/discharge system.

FIG. 4 is a diagram illustrating an example of a first database provided in the system server.

FIG. 5 is a diagram illustrating an example of a second database provided in the system server.

FIG. 6 is a diagram illustrating an example of a hardware configuration of the system server.

FIG. 7 is a flowchart illustrating an operation of the charge/discharge system.

FIG. 9 is a diagram for explaining a power purchase price in the charge/discharge system.

FIG. 10 is a diagram for explaining a power selling price in the charge/discharge system.

FIG. 11 is a schematic diagram illustrating a configuration in a case where the charge/discharge system is applied to an EV.

FIG. 12 is a schematic diagram illustrating a configuration in a case where the charge/discharge system is applied to a mobile power feed vehicle.

FIG. 13 is a diagram for explaining a power selling price in a case where the charge/discharge system is applied to a mobile power feed vehicle.

FIG. 14 is a schematic diagram illustrating a configuration in a case where the charge/discharge system is applied to a ship.

FIG. 15 is a diagram schematically illustrating a system configuration of an EV according to a second embodiment.

FIG. 16 is a block diagram illustrating a configuration of a navigation system used for the EV.

FIG. 17 is a diagram illustrating a route display example of the navigation system.

FIG. 18 is a diagram illustrating a configuration of an in-travel charge/discharge system in a third embodiment.

DETAILED DESCRIPTION

Figure 1:
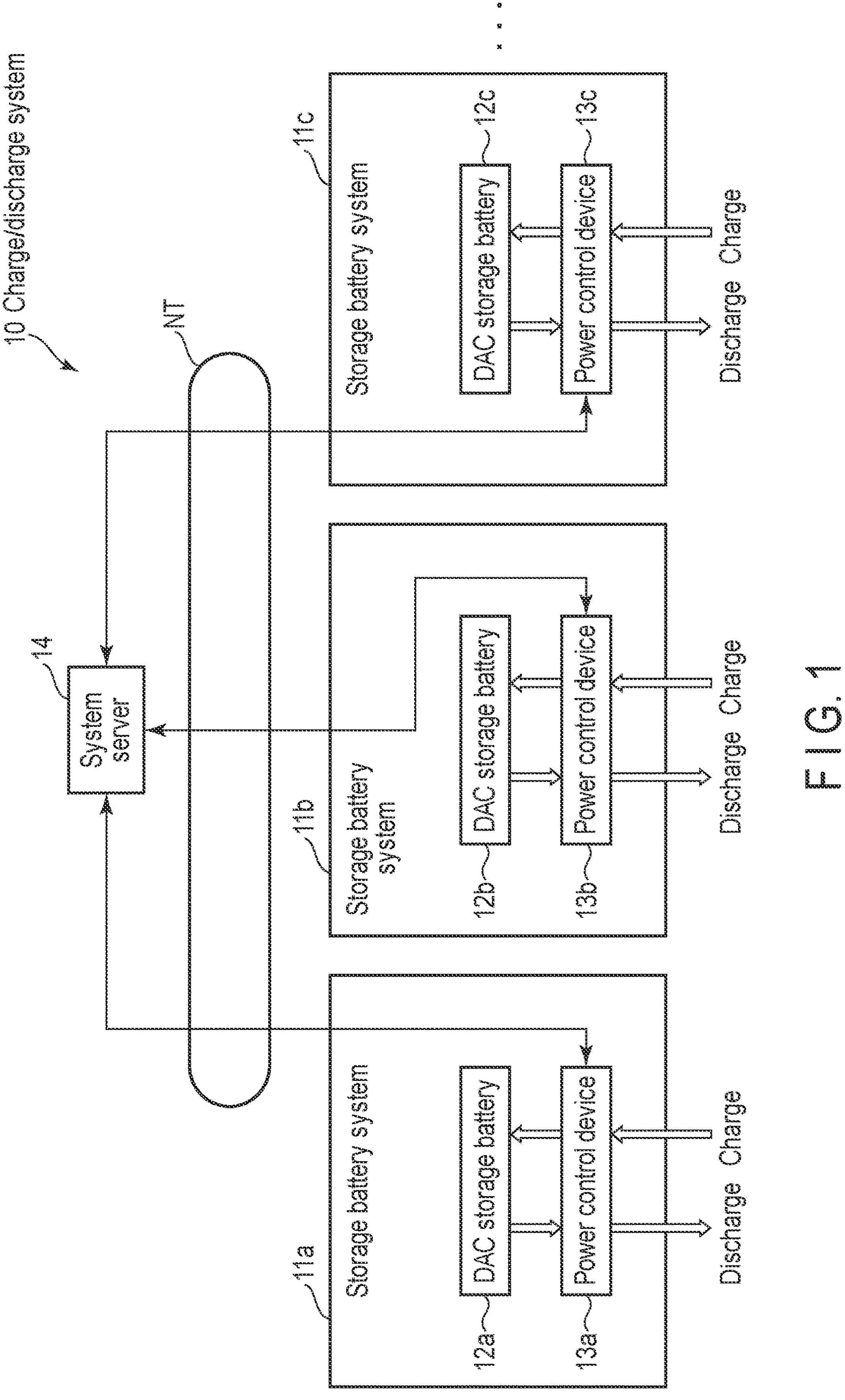
FIG. 1 is a diagram illustrating a configuration of a charge/discharge system according to a first embodiment.

In general, according to one embodiment, a charge/discharge system comprises a storage battery and a control device. The storage battery is configured to absorb CO2 during charging and release CO2 during discharging. The control device is configured to control a charge/discharge operation of the storage battery. The control device is configured to calculate a power trading price during charging based on at least a power purchase price, which is determined by a charge power amount and charge timing, and a first emissions trading price corresponding to a CO2 absorption amount according to the charge power amount. The control device is configured to calculate a power trading price during discharging based on at least a power selling price, which is determined by a discharge power amount and discharge timing, and a second emissions trading price corresponding to a CO2 emission amount according to the discharge power amount. The control device is configured to control the charge/discharge operation of the storage battery to perform charging and discharging when the power trading price during charging is lower than the power trading price during discharging.

Embodiments will be described hereinafter with reference to the accompanying drawings.

Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. Further, in the specification and drawings, corresponding elements are denoted by like reference numerals, and a detailed description thereof may be omitted unless otherwise necessary.

In the present embodiment, it is assumed that a user has a direct air capture (DAC) storage battery. The DAC storage battery has a characteristic of absorbing CO2 during charging and releasing CO2 during discharging. Note that, since the structure of the DAC storage battery is not directly related to the present invention, the detailed description thereof will be omitted here.

Considering the expenditure and revenue of power trading due to charging and discharging of the DAC storage battery from the viewpoint of the user side, the following is obtained.

At the time of charging: power purchase (expenditure), CO2 emissions trading price (revenue)

At the time of discharging: power selling (revenue), CO2 emissions trading price (expenditure)

User's expenditure=power purchase (expenditure)−CO2 emissions trading price (revenue)−power selling (revenue)+CO2 emissions trading price (expenditure)

The power purchase price and the power selling price are market prices, and vary depending on the date-and-time and the region. The CO2 emissions trading price is determined by the CO2 emission amount. Since the DAC storage battery absorbs CO2 at the time of charging, the CO2 emissions trading price becomes a sale price (revenue). Conversely, since CO2 is released at the time of discharging, the CO2 emissions trading price is a purchase price (expenditure). The present embodiment proposes a mechanism in which a user can obtain a profit in consideration of a CO2 emissions trading price unique to such a DAC storage battery.

First Embodiment

FIG. 1 is a diagram illustrating a configuration of a charge/discharge system according to a first embodiment.

The charge/discharge system 10 in the present embodiment includes a plurality of storage battery systems 11*a*, 11*b*, 11*c* . . . , and a system server 14 connected to these storage battery systems 11*a*, 11*b*, 11*c* . . . via a communication network NT.

The storage battery systems 11*a*, 11*b*, 11*c* . . . respectively include DAC storage batteries 12*a*, 12*b*, 12*c* . . . and power control devices 13*a*, 13*b*, 13*c* . . . . The DAC storage batteries 12*a*, 12*b*, 12*c* . . . have characteristics of absorbing CO2 during charging and releasing CO2 during discharging. The DAC storage batteries 12*a*, 12*b*, 12*c* . . . are used as, for example, a power source of a house, a facility, or the like, or a power source of a moving body such as an electric vehicle. Alternatively, the DAC storage batteries 12*a*, 12*b*, 12*c* . . . may be connected to a power generation facility using renewable energy, and may function as an adjustment force for preparing for fluctuation of a supply force, or may function as a storage battery for virtual power plant (VPP). The power control devices 13*a*, 13*b*, 13*c* . . . control the charging and discharging of the DAC storage batteries 12*a*, 12*b*, 12*c* . . . under the control of the system server 14.

Hereinafter, any one of the power control devices 13*a*, 13*b*, 13*c* . . . will be referred to as a power control device 13 as a representative. Similarly, any one of the DAC storage batteries 12*a*, 12*b*, 12*c* . . . will be referred to as a DAC storage battery 12 as a representative.

FIG. 2 is a block diagram illustrating a configuration of the power control device 13 used in the charge/discharge system 10.

The power control device 13 includes a control device 21, a storage device 22, a communication device 23, an input device 24, a display device 25, and a charge/discharge device 26. The control device 21 includes a hardware processor including a CPU, and controls the power of the DAC storage battery 12 by reading a program stored in the storage device 22. The storage device 22 includes memory devices such as a ROM and a RAM, and stores various data necessary for processing of the control device 21, a control program for controlling power of the DAC storage battery 12, and the like. The communication device 23 includes a communication device having a predetermined communication protocol, and performs communication processing with the system server 14.

The input device 24 includes, for example, an input device such as a keyboard or a touch panel, and is used when a user inputs a setting value of a power purchase price or a power selling price. The display device 25 includes, for example, a display device such as a liquid crystal display (LCD), and is used when a remaining power amount of the DAC storage battery 12 is displayed, for example. Note that, as the input device 24 and the display device 25, a mobile terminal held by a user may be used, or a car navigation system mounted on an electric vehicle may be used.

The charge/discharge device 26 discharges or charges the DAC storage battery 12 in a wired or wireless manner. The DAC storage battery 12 is mounted on a moving body such as an electric vehicle (EV), or is installed stationary in a building including a house, a facility, or the like. The DAC storage battery 12 has a predetermined capacity and is used as a drive source of a target device 27. The target device 27 is, for example, a moving body such as an electric vehicle or an electronic device used in a building, and includes all devices that can be driven by the DAC storage battery 12. Note that, when the target device 27 is a moving body such as an electric vehicle, the DAC storage battery 12 may be included in the target device 27.

FIG. 3 is a block diagram illustrating a configuration of the system server 14 used in the charge/discharge system 10.

The system server 14 includes a control device 31, a communication device 32, and a storage device 33. The control device 31 includes a hardware processor including a CPU, and reads a control program stored in the storage device 33 to execute charge/discharge processing for the purpose of user benefit. The control device 31 includes an acquisition unit 31*a*, a first trading price calculator 31*b*, a second trading price calculator 31*c*, and a charge/discharge controller 31*d* as functional units for realizing the present system.

The acquisition unit 31*a* acquires information necessary for electric power trading processing. Specifically, the acquisition unit 31*a* acquires power purchase price setting values UB1 and UB2 and power selling price setting values US1 and US2 of the user through the power control device 13.

The "power purchase price setting values UB1 and UB2" are prices that are used as threshold values when the user purchases power, and at least two or more prices are set in stages according to intention of the user (UB1<UB2). The "power purchase price setting values UB1 and UB2" can be changed to an arbitrary value as appropriate (For example, it is changed according to a case where an amount of solar power generation is large and a power selling price (market price) is lowered, such as hot summer day).

The "power selling price setting values US1 and US2" are prices set as threshold values when the user sells power, and at least two or more prices are set in stages according to intention of the user (US1>US2). The "power selling price setting values US1 and US2" can be changed to an arbitrary value as appropriate (For example, it is changed according to a case where power demand is high and a power selling price (market price) is high, such as a cold night in winter).

The first trading price calculator 31*b* calculates a power trading price CP at the time of charging based on at least a power purchase price BP (market price), which is determined by a charge power amount and charge timing, and an emissions trading price ED1 (sale price). The emissions trading price ED1 (sale price) is determined by a $CO_2$ absorption amount according to a charge power amount of the DAC storage battery 12.

The second trading price calculator 31*c* calculates a power trading price DP at the time of discharging based on at least a power selling price SP (market price) determined by a discharge power amount and discharge timing, and an emissions trading price ED2 (purchase price). The emissions trading price ED2 (purchase price) is determined by a $CO_2$ emission amount corresponding to the discharge power amount.

The charge/discharge controller 31*d* controls a charge/discharge operation of the DAC storage battery 12 so that the user can obtain a profit based on the power trading price CP at the time of charging and the power trading price DP at the time of discharging. Specifically, the charge/discharge controller 31*d* controls the charge/discharge operation of the DAC storage battery 12 so as to perform charge/discharge when the power trading price CP during charging is lower than the power trading price DP during discharging (See steps S25 and S30 in FIG. 8).

Note that some or all of the functions (acquisition unit 31*a*, first trading price calculator 31*b*, second trading price calculator 31*c*, and charge/discharge controller 31*d*) provided in the control device 31 may be provided in the control device 21 of the power control device 13 illustrated in FIG. 2.

The communication device 32 includes a communication device having a predetermined communication protocol, and performs communication processing with the power control device 13. The storage device 33 includes memory devices such as a ROM and a RAM, and stores various data necessary for processing of the control device 31, a control program related to charge and discharge processing, and the like. Furthermore, the storage device 33 is provided with a first database (DB) 34 and a second database (DB) 35.

FIG. 4 is a diagram illustrating an example of the first database 34.

In the first database 34, the power purchase price setting values UB1 and UB2 and the power selling price setting values US1 and US2 of users acquired by the acquisition unit 31*a* are stored in association with identification information (user ID) unique to each user. The power purchase price setting values UB1 and UB2 and the power selling price setting values US1 and US2 may be further associated with information related to a setting date-and-time. In a case where the new power purchase price setting values UB1 and UB2 and power selling price setting values US1 and US2 are set, a value associated with the latest date-and-time may be adopted.

FIG. 5 is a diagram illustrating an example of the second database 35.

In the second database 35, the power purchase price BP and the emissions trading price ED1 (sale price), and the power selling price SP and the emissions trading price ED2 (purchase price) are stored in association with a price update date-and-time.

(Hardware Configuration)

FIG. 6 is a diagram illustrating an example of a hardware configuration of the system server 14.

The system server 14 includes, as hardware components, a CPU 101, a nonvolatile memory 102, a main memory 103, a communication device 104, and the like.

The CPU 101 is a hardware processor that controls an operation of the control device 31 illustrated in FIG. 3. The CPU 101 executes various programs loaded from the nonvolatile memory 102 as a storage device to the main memory 103. The program executed by the CPU 101 includes not only an operating system (OS) but also a program (Hereinafter, referred to as a charge/discharge program.) 103*a* for executing a processing operation illustrated in the flowcharts of FIGS. 7 and 8.

The acquisition unit 31*a*, the first trading price calculator 31*b*, the second trading price calculator 31*c*, and the charge/discharge controller 31*d* illustrated in FIG. 3 are realized by causing the CPU 101, which is a computer, to execute the charge/discharge program 103*a*. The charge/discharge program 103*a* is a program for realizing charge/discharge processing that enables the user to obtain a profit, and may be stored in a computer-readable storage medium and distributed, or may be downloaded to another computer through a network. Note that some or all of the acquisition unit 31*a*, the first trading price calculator 31*b*, the second trading price calculator 31*c*, and the charge/discharge controller 31*d* may be implemented by hardware such as an integrated circuit (IC), or may be implemented as a combination of the software and the hardware.

The nonvolatile memory 102 and the main memory 103 correspond to the storage device 33 illustrated in FIG. 3. The communication device 104 is a device configured to execute, for example, wired or wireless communication with an external device, and corresponds to the communication device 32 in FIG. 3.

Next, the operation of the charge/discharge system 10 in the present embodiment will be described.

In actual operation, charge and discharge based on demand prediction is performed. For example, in a case where 10 KWh of power is to be used, it is necessary that a remaining power amount of the DAC storage battery 12 is more than 10 KWh, and the shortage is charged and the surplus is discharged. In the present embodiment, it is assumed that charging and discharging is performed for the user to make a profit by trade of power regardless of the remaining power amount of the DAC storage battery 12. In the following description, it is assumed that there is a free capacity required for charging in the DAC storage battery 12 at the time of charging, and power required for discharging is accumulated in the DAC storage battery 12 at the time of discharging. Note that, in a case of discharging in which a condition under which the user can obtain a profit is satisfied (step S30 in FIG. 8 described later), "full charge→full discharge" is the maximum profit.

Figure 8:
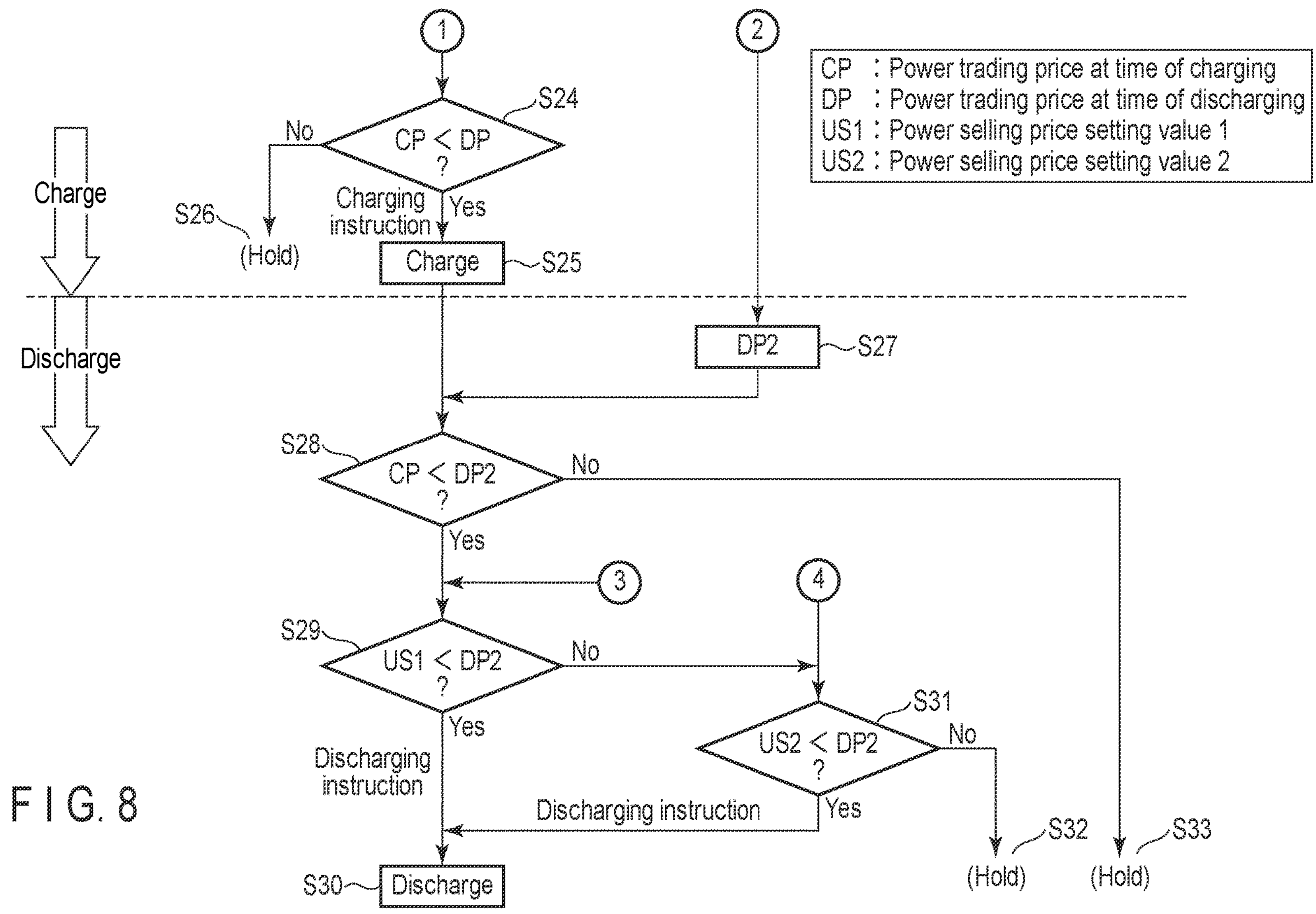
FIG. 8 is a flowchart illustrating an operation of the charge/discharge system.

FIGS. 7 and 8 are flowcharts illustrating an operation of the charge/discharge system 10. Processing illustrated in the flowcharts is realized by the control device 31 provided in the system server 14, that is, the CPU 101 which is a computer, reading the above-described charge/discharge program 103*a*.

First, as illustrated in FIG. 7, as an initial setting, the control device 31 (CPU 101) acquires information necessary for the trade of power from the user (steps S11 to S14). Specifically, the control device 31 acquires the power purchase price setting values UB1 and UB2 and the power selling price setting values US1 and US2, which are the desired prices of the user, from the power control device 13 on the user side illustrated in FIG. 2 via the communication network NT. The power purchase price setting value UB1 is smaller than the power purchase price setting value UB2. The power selling price setting value US1 is higher than the power selling price setting value US2. These setting values UB1, UB2, US1, and US2 are stored in the first database 34 illustrated in FIG. 4 in association with the user ID.

Processing of Calculating Power Trading Price CP During Charging

The control device 31 reads information on the current power purchase price BP and emissions trading price ED1 (sale price) from the second database 35 illustrated in FIG. 5 (steps S15 to S16). The power purchase price BP and the emissions trading price ED1 (sale price) are determined by a specific electric power trader (aggregator) as a market price per unit amount of electric power. As illustrated in FIG. 9, information for determining the power purchase price BP includes a "charge power amount", a "charge timing", and a "charge location".

The "charge power amount" is an amount of power to charge the DAC storage battery 12, and is determined by a power-suppliable capacity on a power supply side. In the present embodiment, it is intended for the user to make a profit by the trade of power, and this charge power amount is not related to the current remaining power amount of the DAC storage battery 12.

The "charge timing" includes a time zone such as morning/afternoon/night. Since the power purchase price BP varies depending on the time zone, it is determined by the charge timing.

The "charge location" is assumed to be a case where the DAC storage battery 12 is mounted on a moving body such as an EV. The power purchase price BP varies depending on a region where the DAC storage battery 12 is charged, and thus is determined depending on a charge location.

However, in a case where a stationary storage battery is assumed, it is not necessary to consider the charge location. In the case of the stationary storage battery, the power purchase price BP is determined at least by the "charge power amount" and the "charge timing".

The emissions trading price ED1 (sale price) is determined according to the CO2 absorption amount at the time of charging the DAC storage battery 12. When the power purchase price BP (market price) and the emissions trading price ED1 (sale price) are obtained, the control device 31 calculates the power trading price CP (an amount paid by the user) at the time of charging by the following Formula (1) based on these prices BP and ED1 (step S17).

Power trading price during charging:

$$CP=BP-ED1 \quad (1)$$

That is, the power trading price CP at the time of charging is obtained by subtracting the emissions trading price ED1 (sale price) of CO2 from the power purchase price BP (market price).

Processing of Calculating Power Trading Price DP During Discharging

The control device 31 reads information related to the current power selling price SP and emissions trading price ED2 (purchase price) from the second database 35 illustrated in FIG. 5 (steps S18 to S19). The power selling price SP and the emissions trading price ED2 (purchase price) are determined by a specific electric power trader (aggregator) as a market price per unit amount of electric power. As illustrated in FIG. 10, information for determining the power selling price SP includes a "discharge power amount", a "discharge timing", and a "discharge location".

The "discharge power amount" is an amount of power discharged from the DAC storage battery 12, and is determined according to the "charge power amount". In the present embodiment, it is intended for the user to make a profit by the trade of power, and this discharge power amount is not related to the current remaining power amount of the DAC storage battery 12.

The "discharge timing" includes a time zone such as morning/afternoon/night. Similarly to the power purchase price BP, the power selling price SP also varies depending on the time zone, and thus is determined by the discharge timing.

The "discharge location" is assumed to be a case where the DAC storage battery 12 is mounted on a moving body such as an EV. Similarly to the power purchase price BP, the power selling price SP also varies depending on a region where the DAC storage battery 12 is discharged, and thus is determined depending on a discharge location.

However, in a case where a stationary storage battery is assumed, it is not necessary to consider the discharge location. In the case of the stationary storage battery, the power selling price SP is determined by at least the "discharge power amount" and the "discharge timing".

The emissions trading price ED2 (purchase price) is determined according to the CO2 emission amount at the time of discharging the DAC storage battery 12. When the power selling price SP (market price) and the emissions trading price ED2 (purchase price) are obtained, the control device 31 calculates the power transaction price DP (an amount received by the user) at the time of discharging by the following Formula (2) based on these prices SP and ED2 (step S20).

Power trading price during discharging:

$$DP=SP-ED2 \quad (2)$$

That is, the power trading price DP at the time of discharging is obtained by subtracting the emissions trading price ED2 (purchase price) of CO2 from the power selling price SP (market price).

When the power trading price CP at the time of charging and the power trading price DP at the time of discharging are calculated in this manner, the following processing is executed.

The control device 31 compares the power purchase price setting value UB1 of the user with the power trading price CP at the time of charging (step S21). In a case where the power purchase price setting value UB1 is higher than the power transaction price CP at the time of charging (UB1>CP) (Yes in step S21), the control device 31 determines that the user is likely to obtain a profit (large), and proceeds to processing of step S24.

In a case where the power purchase price setting value UB1 is lower than or equal to the power transaction price CP at the time of charging (UB1≤CP) (No in step S21), the control device 31 compares the power purchase price setting value UB2 set higher than the power purchase price setting value UB1 with the power trading price CP at the time of charging (step S22). In a case where the power purchase price setting value UB2 is higher than the power transaction price CP at the time of charging (UB2>CP) (Yes in step S22), the control device 31 determines that the user is likely to obtain a profit (small), and proceeds to the processing of step S24.

On the other hand, in step S22, in a case where the power purchase price setting value UB2 is lower than or equal to the power transaction price CP at the time of charging (UB2≤CP) (No in step S22), the control device 31 determines that there is a possibility that the user cannot obtain a profit, and holds the charging of the DAC storage battery 12 (step S23).

As illustrated in FIG. 8, in step S24, the control device 31 compares the power trading price CP at the time of charging (an amount paid by the user) with the power trading price DP at the time of discharging (an amount received by the user). As a result, in a case where the power trading price CP at the time of charging is lower than the power transaction price DP at the time of discharging (CP<DP) (Yes in step S24), the control device 31 determines that the user can obtain a profit by discharging (selling power) later, and performs control to charge the DAC storage battery 12 (step S25). Specifically, the control device 31 drives and controls the charge/discharge device 26 in the power control device 13 installed in the storage battery system on the user side to charge the DAC storage battery 12. The charge power amount at this time is the charge power amount serving as a setting reference of the power purchase price BP described in FIG. 9, and is not related to the remaining power amount of the DAC storage battery 12.

On the other hand, in step S24, in a case where the power trading price CP at the time of charging is higher than or equal to the power trading price DP at the time of discharging (CP≥DP) (No in step S24), the control device 31 determines that the user cannot obtain a profit, and holds the charging of the DAC storage battery 12 (step S26).

When the charging on the premise of the user benefit is completed in step S25, the following processing is subsequently executed.

First, the control device 31 calculates the power trading price DP at the time of discharging again (step S27). This is because there is a possibility that the power selling price SP (market price) fluctuates from a time point when the power trading price DP at the time of discharging is calculated in step S20. Also in this case, the power trading price DP at the time of discharging is calculated in consideration of the emissions trading price ED2 (purchase price) of CO2 according to Formula (2) described above.

Hereinafter, in order to distinguish from the power trading price DP at the time of discharging calculated in step S20, the power trading price DP at the time of discharging calculated in step S27 will be referred to as "the power trading price DP2".

The control device 31 compares the power trading price CP at the time of charging with the power trading price DP2 at the time of discharging (step S28). When the power trading price CP at the time of charging is lower than the power trading price DP2 at the time of discharging (CP<DP2) (Yes in step S28), the user can obtain a profit by discharging (power selling). However, when discharging (selling power), it is necessary to consider a desired price of the user. Therefore, the control device 31 compares the power selling price setting value US1 with the power trading price DP2 at the time of discharging (step S29). As a result, in a case where the power selling price setting value US1 is lower than the power trading price DP2 at the time of discharging (US1<DP2), that is, in a case where the power can be sold at a price higher than the desired price of the user (Yes in step S29), the control device 31 performs control to discharge the DAC storage battery 12 (step S30). Specifically, the control device 31 drives and controls the charge/discharge device 26 in the power control device 13 installed in the storage battery system on the user side to discharge the DAC storage battery 12. The discharge power amount at this time is the discharge power amount serving as a setting reference of the power selling price SP described in FIG. 10, and is not related to the remaining power amount of the DAC storage battery 12.

Furthermore, in a case where the power selling price setting value US1 is higher than or equal to the power trading price DP2 at the time of discharging (US1≥DP2) (No in step S29), the control device 31 compares the power selling price setting value US2 set to be lower than the power selling price setting value US1 with the power trading price DP2 at the time of discharging (step S31). As a result, in a case where the power selling price setting value US2 is lower than the power trading price DP2 at the time of discharging (US2<DP2), that is, in a case where the power can be sold at a price higher than the second desired price of the user (Yes in step 31), the control device 31 performs control to discharge the DAC storage battery 12 (step S30). However, the benefit for the user is less than when Yes in step S29 described above. In a case where the power selling price setting value US2 is higher than or equal to the power trading price DP2 at the time of discharging (US2≥DP2) (No in step S31), the control device 31 determines that the user cannot obtain a profit, and holds the discharge of the DAC storage battery 12 (step S32).

On the other hand, in step S28, in a case where the power trading price CP at the time of charging is higher than or equal to the power trading price DP2 at the time of discharging (CP≥DP2) (No in step 28), the control device 31 determines that the user cannot obtain a profit, and holds the discharge of the DAC storage battery 12 (step S33).

Note that the trade of power associated with charging and discharging of the storage battery is performed between the user and a specific electric power trader. For the monetary exchange between the user and the specific electric power trader including the power selling price and the power purchase price, for example, virtual currency using a blockchain technology or the like may be used.

As described above, according to the first embodiment, the charge/discharge operation of the DAC storage battery 12 is controlled so that the user can obtain a profit. In this case, in a case where the stationary storage battery is programmed to be charged at night when the market price is low and to be discharged during the day when the market price is high, for example, a profit can be obtained. Furthermore, in a case of a portable storage battery such as a DAC storage battery mounted on an EV, in consideration of a charge/discharge location in addition to a time difference, it is possible to obtain a profit in a case where a program is performed so that charging is performed in a region with a low market price and discharging is performed in a region with a high market price. The charging and discharging for the purpose of such profits are automatically performed by the present system even if the user is not particularly conscious. Therefore, knowledge about power transaction is unnecessary, and anyone who uses the DAC storage battery as a power source can obtain a profit.

FIG. 11 is a schematic diagram illustrating a configuration in a case where the present system is applied to an EV.

An EV 41 includes a DAC storage battery 42 and a power control device 43. The power control device 43 has a function similar to that of the power control device 13 illustrated in FIG. 2, and is connected to the system server 14 by wireless communication. The system server 14 (control device 31) acquires position information of the EV 41, and controls the charge/discharge operation of the DAC storage battery 42 so that the user can obtain a profit by the procedure illustrated in FIGS. 7 and 8 when the EV 41 is parked in a charge station 44. In this case, since the EV 41 can move in each region, it is possible to obtain a profit by charging (purchasing power) in an inexpensive region and discharging (selling power) in an expensive region.

FIG. 12 is a schematic diagram illustrating a configuration in a case where the present system is applied to a mobile power feed vehicle.

A mobile power feed vehicle 51 is an EV that performs rapid power feeding for a fee to an EV that has run out of power. The mobile power feed vehicle 51 includes a DAC storage battery 52 and a power control device 53. The power control device 53 has a function similar to that of the power control device 13 illustrated in FIG. 2, and is connected to the system server 14 by wireless communication. Furthermore, an EV 61 to be fed includes a storage battery 62 and a power control device 63. The storage battery 62 may be a general storage battery or a DAC storage battery. The power control device 63 performs control to charge the storage battery 62 with power supplied from the outside.

When the EV 61 stops due to power shortage, the mobile power feed vehicle 51 goes to a stop position of the EV 61 and supplies necessary power. In this case, the user of the EV 61 does not go to a charge station to charge, but calls the mobile power feed vehicle 51 to charge. Therefore, the user of the mobile power feed vehicle 51 requests the user of the EV 61 to pay a power selling price (market price)+a (service fee) due to discharge from the host vehicle. The price of a varies depending on the power demand at that time. The higher the power demand, the higher the price of a.

As described above, when discharging from the DAC storage battery 52 of the mobile power feed vehicle 51, it is preferable to calculate the power selling price SP including the price of the “power demand” as illustrated in FIG. 13. Note that, in a case where the DAC storage battery 52 of the mobile power feed vehicle 51 is charged, the DAC storage battery is charged when there is a possibility of obtaining a profit by discharging later, similarly to the stationary storage battery, regardless of the power demand (see step S25 in FIG. 8). On the other hand, since the user of the EV 61 to be supplied with power needs the price of the power demand at the time of charging, it is necessary to calculate the power purchase price BP including the price of the power demand.

Here, the EV-mounted storage battery and the stationary storage battery have different purposes of power storage. The former is only an energy source for traveling, and the EV user charges even if the price is high in order to secure the electric power necessary for traveling.

When a power purchase price in the case of charging a stationary storage battery is denoted by BPa, a power purchase price in the case of charging a general EV is denoted by BPb, and a power purchase price in the case of charging another EV from a mobile power feed vehicle (Discharge occurs from the viewpoint of the mobile power feed vehicle side, and thus, a power selling price) is denoted by BPc, the following relationship is established.

$$BPa<BPb<BPc$$

The power purchase price BPc of the mobile power feed vehicle is the highest because a service charge corresponding to the power demand is added.

FIG. 14 is a schematic diagram illustrating a configuration in a case where the present system is applied to a ship.

A ship 71 includes a DAC storage battery 72 and a power control device 73. The power control device 73 is connected to the system server 14 by wireless communication. The system server 14 (control device 31) acquires position information of the ship 71, and controls the charge/discharge operation of the DAC storage battery 72 so that the user can obtain a profit, for example, when the ship 71 is anchored in a charge station 74. In this case, in the power purchase price BP and the power selling price SP, a price in a sea area where the charge station 74 is present is reflected. Therefore, it is also possible to perform charging (power purchase) in an inexpensive sea area and discharging (power selling) in an expensive sea area.

Here, regarding the ship, the CO2 emission amount is not counted according to the current international marine transportation rule. That is, there is no burden of the emissions trading price ED2 (purchase price) for CO2 emitted from the DAC storage battery 72 at the time of navigation, and it is not necessary to consider the emissions trading price ED2 (purchase price) of CO2 when calculating the power trading price DP at the time of discharging (step S19 in FIG. 7 can be omitted). That is, the power selling price SP can be calculated as the power trading price DP at the time of discharging. Therefore, the power trading price DP (amount of money received by the user) at the time of discharging is higher than that of other moving bodies such as an EV, and a profit (large) from discharge (power selling) can be expected.

Second Embodiment

Next, a second embodiment will be described.

As the second embodiment, a configuration in a case where a charge/discharge system is linked to a navigation system generally used for an EV will be described. Note that, in the following description, the EV will be described as an example, but another moving body such as an electric ship may be used.

FIG. 15 is a diagram schematically illustrating a system configuration of the EV according to the second embodiment.

An EV 41 includes a charge/discharge system 40 and a navigation system 80. The charge/discharge system 40 includes a system server 14, a DAC storage battery 42, and a power control device 43. Since these configurations are similar to those in FIG. 11, the description thereof will be omitted here.

In the second embodiment, the charge/discharge system 40 (the control device 31 of the system server 14) has a function of specifying a charge spot that satisfies the condition of “the power trading price CP at the time of charging<the power trading price DP at the time of discharging” in step S24 on a travel route of the EV 41. Furthermore, the charge/discharge system 40 has a function of specifying a discharge spot satisfying the condition of “power trading price CP at the time of charging<power trading price DP2 at the time of discharging” in step S28 on the travel route of the EV 41.

FIG. 16 is a block diagram illustrating a configuration of the navigation system. Note that, since the navigation system is generally known, only a basic device configuration will be simply described here.

The navigation system 80 includes a control device 81, a communication device 82, a storage device 83, a display device 84, an input device 85, a global positioning system (GPS) 86, and the like. The control device 81 includes a hardware processor including a CPU, and executes navigation processing including route search by reading a control program stored in the storage device 83. The control device 81 has a function of presenting a route optimal for the user to travel to the destination and presenting a charge spot/discharge spot together with a scheduled charge amount/scheduled discharge amount on the route (See FIG. 17.).

The communication device 82 performs communication processing with the system server 14. The storage device 83 stores various types of information necessary for the control device 81 in addition to map information of each region. The display device 84 is used as an in-vehicle monitor, and displays a road map and the like. The input device 85 is used, for example, when the user inputs a destination. The GPS 86 detects the current position of the EV 41 by a GPS signal.

FIG. 17 is a diagram illustrating a route display example of the navigation system.

The navigation system 80 (control device 81) displays a road map as illustrated in FIG. 17 on the display device 84 when the EV 41 travels. This road map shows a route R1 from the current position of the EV 41 to the destination of the user. On this route R1, the charge spot/discharge spot specified by the charge/discharge system 40 is presented together with the scheduled charge amount/scheduled discharge amount.

In the drawing, CS1 and CS2 indicate charge spots, and DS1 and DS2 indicate discharge spots. The charge spot CS1 and the discharge spot DS1 represent spots where it is better to charge/discharge for profit when the EV 41 is traveling in a region A. The charge spot CS2 and the discharge spot DS2 represent spots where it is better to charge/discharge for profit when the EV 41 is traveling in a region B. Note that the charge spot is specifically a charge station of the EV, but this charge station may also serve as a discharge spot.

"YY KW" indicates the scheduled charge amount, and "ZZ KW" indicates the scheduled discharge amount. The scheduled charge amount and the scheduled discharge amount are set by the navigation system 80 within a range that does not interfere with traveling from a relationship between a power amount (accumulation amount) Pa of the DAC storage battery 42 at the current location and a power amount Pb necessary for traveling from the current location to the destination. Specifically, the scheduled charge amount is set to be larger than an amount obtained by subtracting the power amount Pa from the power amount Pb. The scheduled discharge amount is set to be smaller than an amount obtained by subtracting the power amount Pb from the sum of the power amount Pa and the scheduled charge amount.

In a case where there are many charge spots/discharge spots in other places, the scheduled charge amount/scheduled discharge amount is presented for each of these spots. In a case where there is a charge spot or a discharge spot in a different route from the current location to the destination, these spots may be presented together with the scheduled charge amount/scheduled discharge amount in a form different from the current route (such as changing the color).

As described above, according to the second embodiment, the charge spot and the discharge spot can be presented on the route from the current location to the destination by cooperating with the navigation system. Therefore, in a case where the user charges at the charge spot and then discharges at the discharge spot, the user can make a profit by selling power at the time of discharging.

In the second embodiment, the case where both the charge spot and the discharge spot are presented has been described as an example, but only the discharge spot may be presented together with the scheduled discharge amount.

Third Embodiment

Next, a third embodiment will be described.

In the third embodiment, a configuration is assumed in which charging and discharging of a moving body is performed using an in-travel charge/discharge system. The in-travel charge/discharge system is a system that charges a moving body through a power transmitter/power receiver disposed along a traveling path of the moving body and receives power discharged from the mobile body. Hereinafter, an EV will be described as an example of the moving body, but another moving body such as an electric train may be used.

FIG. 18 is a diagram illustrating a configuration of a charge/discharge system during traveling in a third embodiment. An EV 41 includes a charge/discharge system 40 and a navigation system 80. As illustrated in FIG. 15, the charge/discharge system 40 includes a system server 14, a DAC storage battery 42, and a power control device 43. The navigation system 80 has a function of searching for a route optimal for the user to travel to the destination. The configuration of the navigation system 80 is similar to that in FIG. 16.

An in-travel charge/discharge system 90 wirelessly performs discharge/charge by electromagnetic coupling between a plurality of power transmission/power reception pads 92*a*, 92*b*, 92*c* . . . disposed along a traveling path 91 and a power transmission/power reception pad 93 installed in the EV 41. The power transmission/power reception pads 92*a*, 92*b*, 92*c* . . . are a power transmitter and a power receiver installed on a traveling path side. The power transmission/power reception pads 92*a*, 92*b*, 92*c* . . . are connected to drive circuits 94*a*, 94*b*, 94*c* . . . , generate a magnetic field when facing the EV 41, and perform power transmission/power reception in a non-contact manner. The power transmission/power reception pad 93 is a power transmitter and a power receiver installed on an EV side. The power transmission/power reception pad 93 is connected to the DAC storage battery 42 via the power control device 43 illustrated in FIG. 15.

For example, in a case where the EV 41 is stopped on the power transmission/power reception pad 92*a*, power is sent from the power transmission/power reception pad 92*a* to the EV 41. On the side of the EV 41, the power from the power transmission/power reception pad 92*a* is received by the power transmission/power reception pad 93 and stored in the DAC storage battery 42. Conversely, the power discharged from the DAC storage battery 42 is received by the power transmission/power reception pad 92*a*.

Note that, although the example of FIG. 18 illustrates the configuration in which power is transmitted/received wirelessly by electromagnetic coupling when the moving body is stopped, power may be transmitted/received during traveling in a contact manner, for example, as in a pantograph of a train.

In the third embodiment, the charge/discharge system 40 (the control device 31 of the system server 14) has a function of specifying a discharge section that satisfies the condition of "the power trading price CP at the time of charging<the power trading price DP2 at the time of discharging" in step S28 on the travel route of the EV 41. The navigation system 80 (control device 81) has a function of presenting a route optimal for the user to travel to the destination and presenting a discharge section together with a scheduled discharge amount on the route (See FIG. 19.).

Figure 19:
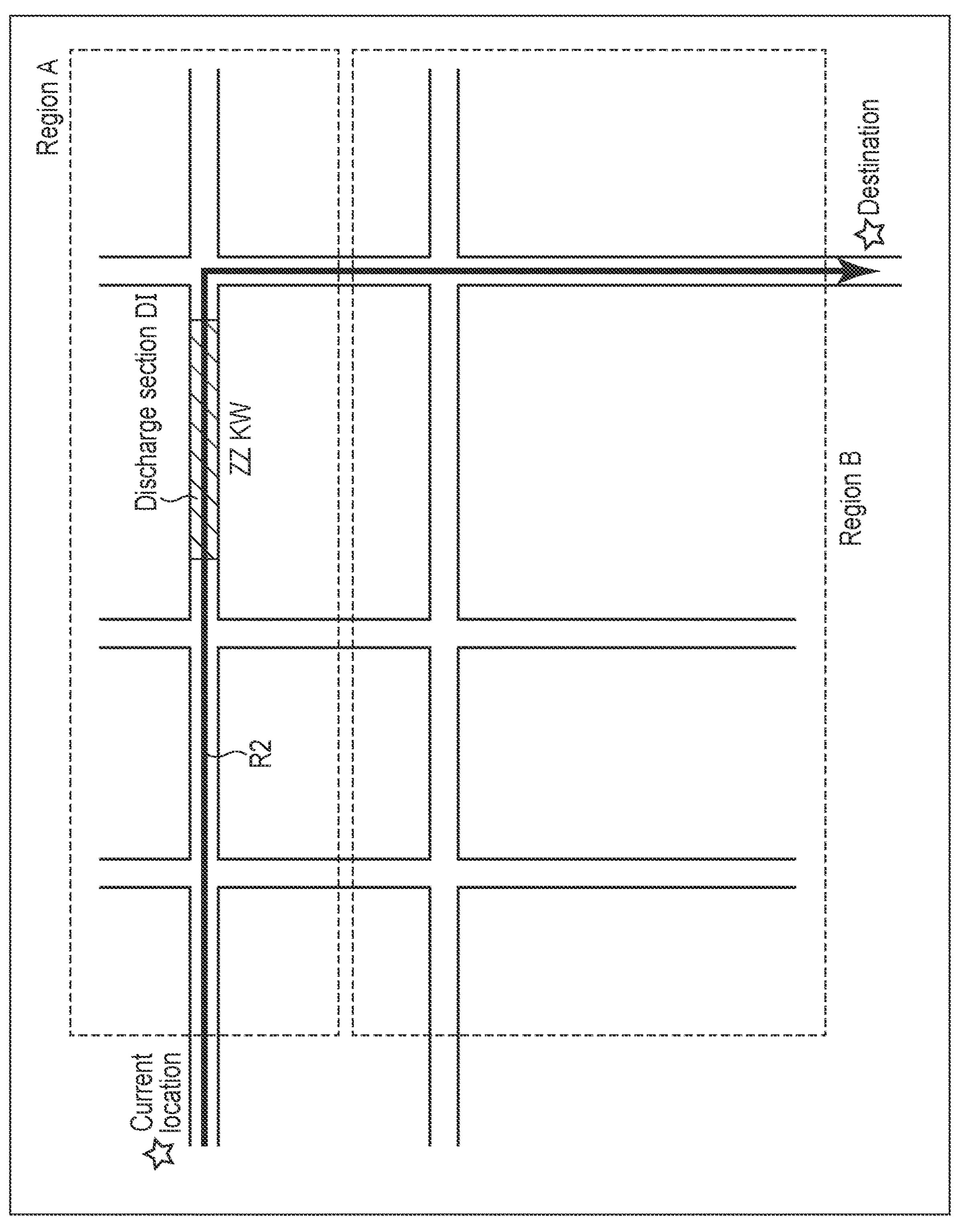
FIG. 19 is a diagram illustrating a route display example of a navigation system in the in-travel charge/discharge system.

FIG. 19 is a diagram illustrating a route display example of the navigation system in the in-travel charge/discharge system.

The navigation system 80 (control device 81) displays a road map as illustrated in FIG. 19 on the display device 84 when the EV 41 travels. This road map shows a route R2 from the current position of the EV 41 to the destination of the user. On the route R2, a discharge section specified by the charge/discharge system 40 is presented together with a scheduled discharge amount.

In the drawing, DI represents the discharge section. The discharge section DI represents a section in which it is better for the EV 41 to discharge for profit while traveling on the traveling path 91 of the in-travel charge/discharge system illustrated in FIG. 18. "ZZ KW" indicates the scheduled discharge amount. The scheduled discharge amount is obtained by the navigation system 80 within a range that does not interfere with traveling from a relationship between an amount of power (accumulated amount) Pa of the DAC storage battery 42 at the current location and an amount of power (traveling required amount of power) Pb required for traveling from the current location to the destination. Specifically, the scheduled discharge amount is set to be smaller than an amount obtained by subtracting the power amount Pb from the sum of the power amount Pa and the scheduled charge amount. In this case, regarding the scheduled charge amount, the scheduled discharge amount may be set on the assumption that a certain amount is charged before reaching the destination, or the scheduled discharge amount may be set on the assumption that there is no scheduled charge.

In a case where there are many discharge spots in other places, the scheduled discharge amount is presented for each of these spots. In a case where there are discharge spots in a different route from the current location to the destination, these spots may be presented together with the scheduled discharge amount in a form different from the current route (such as changing the color).

As described above, according to the third embodiment, even in the case of using the in-travel charge/discharge system in which the moving body can be charged and discharged while traveling, the discharging section can be presented on the route from the current location to the destination by cooperating with the navigation system. Therefore, in a case where the user checks the discharge section during traveling and performs discharging there, the user can obtain a profit by selling power at the time of discharging.

In the third embodiment, the case where only the discharge section is presented has been described as an example. However, similarly to the second embodiment, the charge section may also be specified, and the charge section may be presented together with the scheduled charge amount. In this case, the scheduled charge amount is set to be larger than an amount obtained by subtracting the power amount Pa from the power amount Pb. The power amount Pb is a power amount required for traveling from the current location to the destination, and the power amount Pa is a power amount (accumulation amount) of the DAC storage battery 42 at the current location.

According to at least one embodiment described above, it is possible to provide a charge/discharge system and a moving body capable of efficiently charging and discharging a storage battery and obtaining a profit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A charge/discharge system comprising:

a storage battery configured to absorb carbon dioxide ($CO_2$) during charging and release $CO_2$ during discharging; and a control device configured to control a charge/discharge operation of the storage battery, wherein the control device is configured to:

calculate a power trading price during charging based on at least a power purchase price, which is determined by a charge power amount and charge timing, and a first emissions trading price corresponding to a $CO_2$ absorption amount according to the charge power amount, calculate a power trading price during discharging based on at least a power selling price, which is determined by a discharge power amount and discharge timing, and a second emissions trading price corresponding to a $CO_2$ emission amount according to the discharge power amount, and control the charge/discharge operation of the storage battery to perform charging and discharging when the power trading price during charging is lower than the power trading price during discharging.

2. The charge/discharge system of claim 1, wherein the power purchase price is further determined from a charge location, and the power selling price is further determined from a discharge location.

3. The charge/discharge system of claim 1, wherein the power purchase price is further determined from power demand, and the power selling price is further determined from power demand.

4. The charge/discharge system of claim 1, wherein the control device is configured to:

calculate a price obtained by subtracting the first emissions trading price from the power purchase price, as the power trading price during charging, and calculate a price obtained by subtracting the second emissions trading price from the power selling price, as the power trading price during discharging.

5. The charge/discharge system of claim 1, wherein the control device is configured to calculate the power selling price as the power trading price during discharging when the storage battery is used in a ship.

6. A moving body comprising:

a navigation system configured to search for a route from a current location to a destination; and the charge/discharge system of claim 2, wherein the charge/discharge system is configured to specify a discharge spot, on the route, where the power trading price during charging is lower than the power trading price during discharging, and the navigation system is configured to present the discharge spot together with a scheduled discharge amount.

7. The moving body of claim 6, wherein the charge/discharge system is configured to specify a charge spot, on the route, where the power trading price during charging is lower than the power trading price during discharging, and the navigation system is configured to present the charge spot together with a scheduled charge amount.

8. The moving body of claim 7, wherein the scheduled discharge amount is set to be smaller than an amount obtained by subtracting an amount of power required for traveling from the current location to the destination from a sum of a remaining power amount of the storage battery at the current location and the scheduled charge amount, and the scheduled charge amount is set to be greater than an amount obtained by subtracting the remaining power amount of the storage battery at the current location from the amount of power required for traveling from the current location to the destination.

9. A moving body chargeable and dischargeable while traveling through a power transmitter/power receiver provided on a traveling path, the moving body comprising:

a navigation system is configured to search for a route from a current location to a destination; and the charge/discharge system of claim 2, wherein the charge/discharge system is configured to specify a discharge section, on the route, in which the power trading price during charging is lower than the power trading price during discharging, and the navigation system is configured to present the discharge section together with a scheduled discharge amount.

10. The moving body of claim 9, wherein the charge/discharge system is configured to specify a charge section, on the route, in which the power trading price during charging is lower than the power trading price during discharging, and the navigation system is configured to present the charge section together with a scheduled charge amount.

11. The moving body of claim 10, wherein the scheduled discharge amount is set to be smaller than an amount obtained by subtracting an amount of power required for traveling from the current location to the destination from a sum of a remaining power amount of the storage battery at the current location and the scheduled charge amount, and the scheduled charge amount is set to be greater than an amount obtained by subtracting the remaining power amount of the storage battery at the current location from the amount of power required for traveling from the current location to the destination.

12. The charge/discharge system of claim 1, wherein the control device is connected, via a communication network, to a power control device that performs power control of the storage battery and includes:

a first transaction price calculator configured to calculate the power trading price during charging;

a second transaction price calculator configured to calculate the power trading price during discharging; and a charge/discharge controller configured to control the charge/discharge operation of the storage battery based on the power trading price during charging and the power trading price during discharging.

* * * * *